United States Patent
Vasseur et al.

(10) Patent No.: US 9,197,508 B2
(45) Date of Patent: Nov. 24, 2015

(54) TIME-BASED SCHEDULING FOR TUNNELS COMPUTED BY A STATEFUL PATH COMPUTATION ELEMENT

(75) Inventors: Jean-Philippe Vasseur, Saint Martin d'Uriage (FR); Stefano Previdi, Rome (IT); Clarence Filsfils, Brussels (BE); George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 13/524,751

(22) Filed: Jun. 15, 2012

(65) Prior Publication Data

US 2013/0336126 A1   Dec. 19, 2013

(51) Int. Cl.
H04L 12/24     (2006.01)
H04L 12/26     (2006.01)
H04L 12/911    (2013.01)

(52) U.S. Cl.
CPC .......... H04L 41/0896 (2013.01); H04L 41/147 (2013.01); H04L 47/823 (2013.01); H04L 47/825 (2013.01); H04L 47/826 (2013.01)

(58) Field of Classification Search
USPC ................................. 370/252, 235, 229, 230
See application file for complete search history.

(56) References Cited

U.S. PATENT DOCUMENTS

| | | | |
|---|---|---|---|
| 6,665,273 B1 * | 12/2003 | Goguen et al. | 370/252 |
| 6,934,249 B1 * | 8/2005 | Bertin et al. | 370/218 |
| 7,031,262 B2 | 4/2006 | Vasseur et al. | |
| 7,551,569 B2 | 6/2009 | Vasseur | |
| 7,660,254 B2 | 2/2010 | Vasseur et al. | |
| 7,693,055 B2 | 4/2010 | Vasseur et al. | |
| 7,995,500 B2 | 8/2011 | Vasseur | |
| 8,072,879 B2 | 12/2011 | Vasseur et al. | |
| 8,369,213 B2 | 2/2013 | Vasseur et al. | |
| 2002/0172222 A1 | 11/2002 | Ullmann et al. | |

FOREIGN PATENT DOCUMENTS

EP     2009848 A1 * 12/2008
EP     2549703 A1     1/2013

OTHER PUBLICATIONS

Crabbe, et al., "PCEP Extensions for Stateful PCE", IETF Trust, Network Working Group, Internet Draft, draft-ietf-pce-stateful-pce-00, Feb. 2012, 52 pages.
Farrel, et al., "A Path Computation Element (PCE)-Based Architecture", The Internet Society, Network Working Group, Request for Comments 4655, Aug. 2006, 41 pages.

(Continued)

*Primary Examiner* — Edan Orgad
*Assistant Examiner* — Sithu Ko
(74) *Attorney, Agent, or Firm* — Parker Ibrahim & Berg LLC; James M. Behmke; Stephen D. LeBarron

(57) ABSTRACT

In one embodiment, a path computation element (PCE) in a computer network receives one or more path computation requests (PCReqs), and records a time of each PCReq and the corresponding requested bandwidth. Based on this information, the PCE may determine a traffic profile of the computer network, and may augment a traffic engineering database (TED) with requested bandwidth according to time based on the traffic profile. As such, prior to a particular time, the PCE may determine placement of tunnels within the traffic profile for the particular time.

20 Claims, 11 Drawing Sheets

(56) References Cited

OTHER PUBLICATIONS

Pan, et al., "Fast Reroute Extensions to RSVP-TE for LSP Tunnels", The Internet Society, Network Working Group, Request for Comments 4090, May 2005, 39 pages.

Vasseur, et al., "Path Computation Element (PCE) Communication Protocol (PCEP)", IETF Trust, Network Working Group, Request for Comments 5440, Mar. 2009, 87 pages.

"Centralized RACF Architecture for MPLS Core Networks", Y.2175, Nov. 2008, pp. 1-26, ITU-T Standard, International Telecommunications Union, Geneva, Switzerland.

Lampreia, et al., "Notification of Transmittal of the International Search Report and the Written Opinion of the International Searching Authority, or the Declaration", Patent Cooperation Treaty, International Application No. PCT/US2013/045914, mailed Oct. 4, 2013, 12 pages, European Patent Office, Rijswijk, Netherlands.

Manousakis, et al., "A Bandwidth Monitoring Mechanism Enhancing SNMP to Record Timed Resource Reservations", Journal of Network and Systems Management, vol. 14, No. 4, Dec. 2006, pp. 583-597, Kluwer Academic Publishers, Plenum-Publishers, NE.

Zhang, et al., "Applicability of Stateful Path Computation Element (PCE)", Network Working Group, Internet Draft, draft-zhang-pce-stateful-pce-app-00, Mar. 5, 2012, 20 pages, the Internet Engineering Task Force.

\* cited by examiner

TIME-BASED SCHEDULING FOR TUNNELS COMPUTED BY A STATEFUL PATH COMPUTATION ELEMENT

TECHNICAL FIELD

The present disclosure relates generally to computer networks, and, more particularly, to path computation elements (PCEs).

BACKGROUND

Tunnels have been used for a number of applications such as the support of virtual private networks (VPNs) or Traffic Engineering following source routed paths hop-by-hop. Among the number of tunneling techniques developed over the past decade, multiprotocol label switching (MPLS) Traffic Engineering (TE) has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure.

Path computation elements (PCEs), as defined, for example, in the Internet Engineering Task Force's Request for Comment (RFC) 4655, generally consist of relying on an external engine (PCE) responsible for the computation of tunnels in the network. Head-ends (or Path Computation Clients—PCCs) send requests to PCEs (PCReq messages) using the PCEP signaling protocol (RFC 5440), and receive computed paths thanks to replies (PCRep messages). PCEP also specifies notification and error messages. PCEs have been used mostly for back-up tunnel path computation and inter-domain (Inter-area/AS) path computations where per-domain path computation was the only (potentially very sub-optimal) technique available prior to the PCE.

PCE-based networks deployed so far have been stateless. That is, tunnels were computed by the PCE according to the Traffic Engineering Database (TED) fed in most cases by the routing protocol without requiring any state maintenance. However, for certain applications, stateful PCE may provide a more optimal solution. A new stateful PCE draft has been adopted as an IETF Working Document, entitled "PCEP Extensions for Stateful PCE"<draft-ietf-pce-stateful-pce> by Crabbe et al., and which specifies several new PCEP messages, allowing PCCs to update the PCE on their tunnel states (PCRpt messages), control tunnel delegation (ability for the PCE to remotely control a tunnel) and for the PCE to send tunnel requests to PCCs to learn states (PCUpd messages). Stateful PCE architectures, however, still present a number of challenges of various natures.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a path computation element (PCE) in a computer network receives one or more path computation requests (PCReqs), and records a time of each PCReq and the corresponding requested bandwidth. Based on this information, the PCE may determine a traffic profile of the computer network, and may augment a traffic engineering database (TED) with requested bandwidth according to time based on the traffic profile. As such, prior to a particular time, the PCE may determine placement of tunnels within the traffic profile for the particular time.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

Figure 1A:
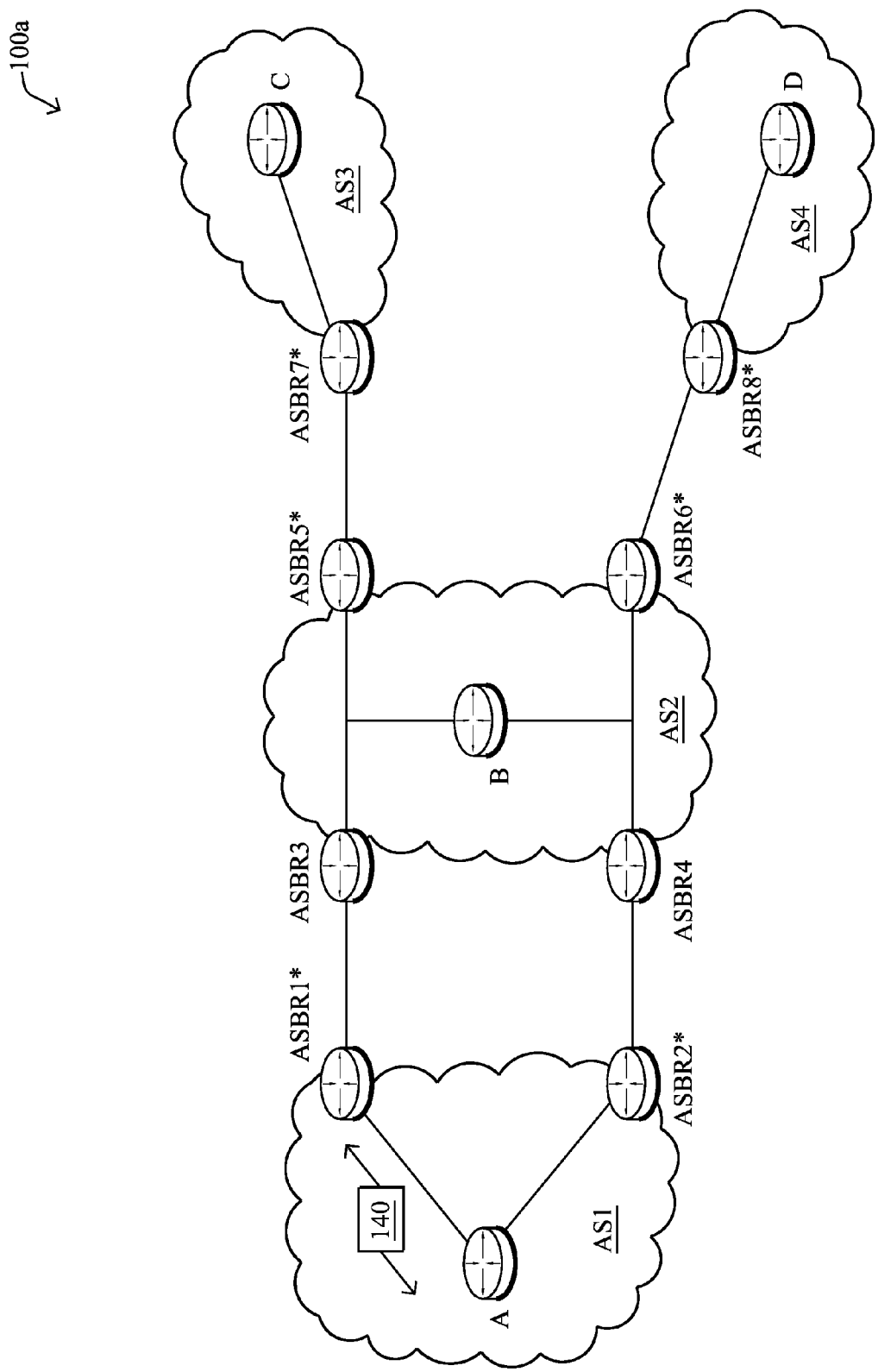
FIGS. 1A-1B illustrate example computer networks.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively.

Figure 1B:
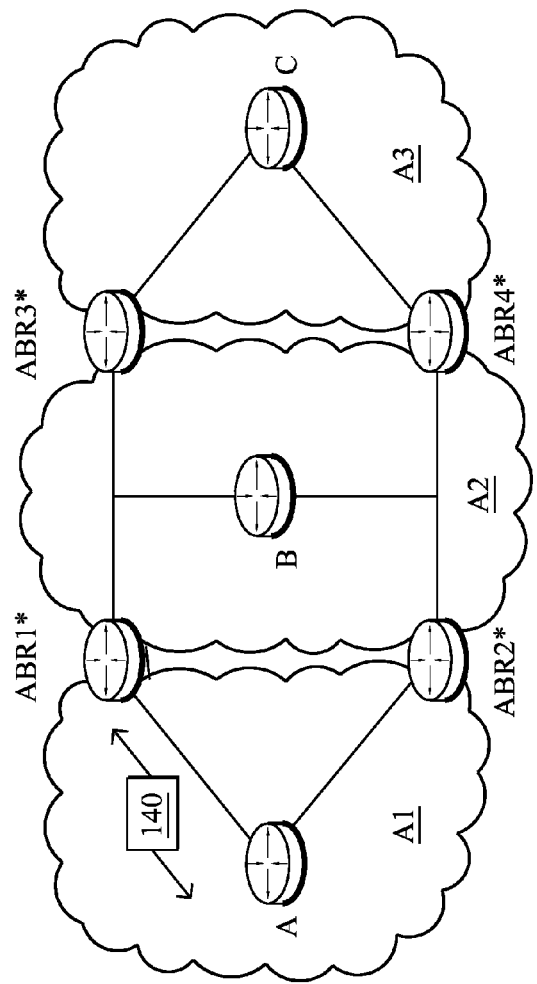

Alternatively or in addition, FIG. 1B is a schematic block diagram of an exemplary computer network 100b comprising areas A1, A2, and A3, each having at least one intradomain router, A, B, and C, respectively. In particular, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network 100 (100a and 100b, generically) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
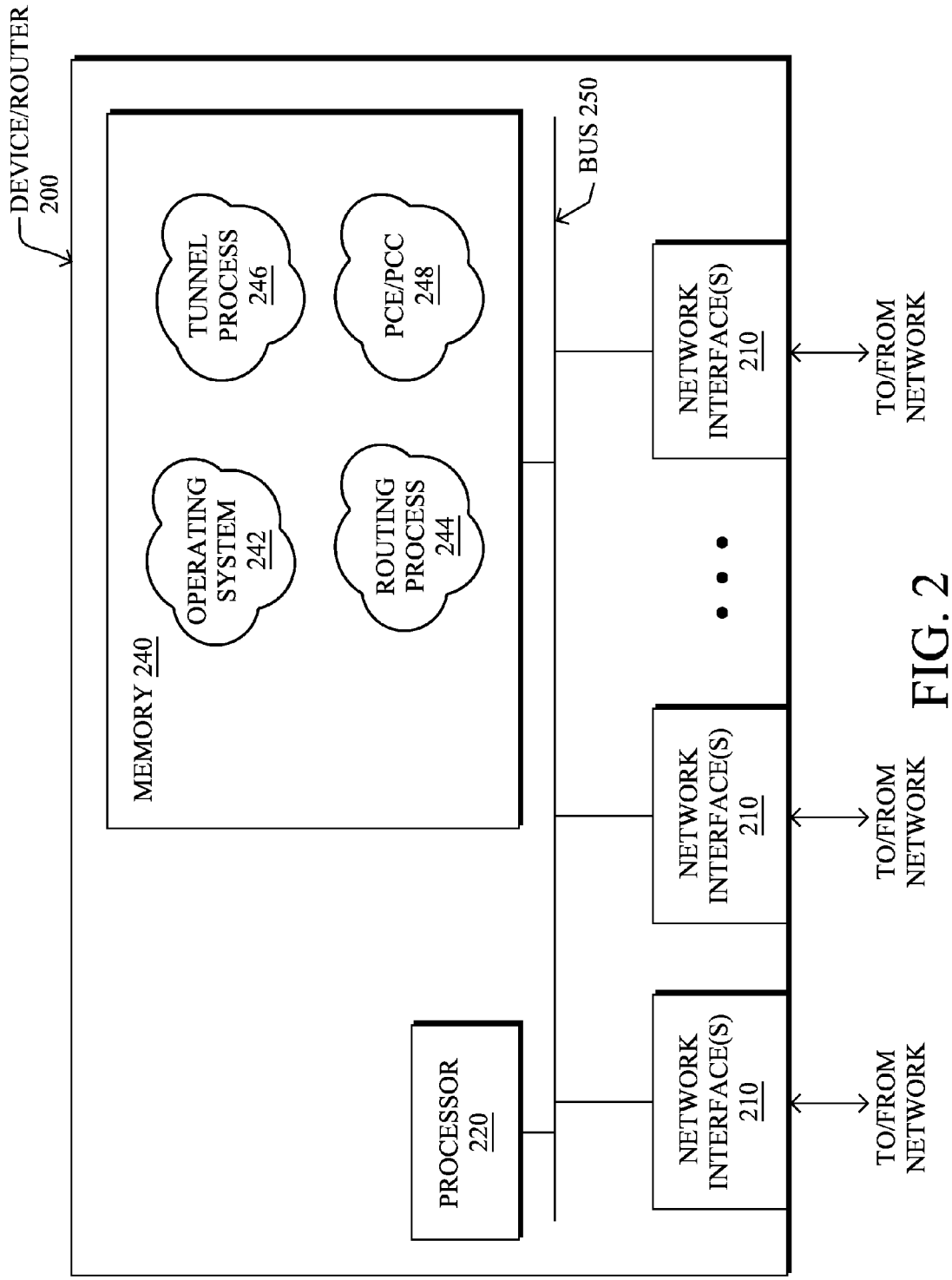
FIG. 2 illustrates an example network device/node.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), IP tunnels, and generic routing encapsulation (GRE) tunnels.

In particular, establishment of a tunnel (e.g., TE-LSP) requires computation of a path between a head-end node (LSR) to a tail-end node, signaling along the path (e.g., through resource reservation protocol (RSVP)-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. In addition, a number of techniques have been developed to allow for dynamic bandwidth adjustment of the signaled bandwidth using RSVP-TE, the allocation of dynamic preemptions so as to mitigate the probability of dead-lock due to bin-packing issues or bandwidth fragmentation, distributed re-optimization techniques to defragment bandwidth in the network, distributed techniques for backup tunnel computation maximizing back-up bandwidth usage according to the assumption of single link/node/SRLG resources (bandwidth sharing between independent resources), etc.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, such as Fast Reroute, e.g., MPLS TE Fast Reroute (RFC4090).

Fast Reroute (FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped") by the last LSR along the backup path, and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

As noted above, tunnels have been used for a number of applications such as the support of virtual private networks (VPNs) or Traffic Engineering following source routed paths hop-by-hop. Among the number of tunneling techniques developed over the past decade, MPLS TE has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure. MPLS TE-LSPs, for example, were originally computed using distributed constrained shortest path first (CSPF) algorithms where each tunnel head-end was responsible for the computation of the LSP path in the network, using a constrained SPF (e.g., Dijsktra) according to the Traffic Engineering Database (TED) distributed by a link state routing protocol such as OSPF or IS-IS.

A series of challenging problems arose that required the use of a new path computation model known as the Path Computation Element (PCE) model, such as defined in RFC4655. The PCE model generally consists of relying on an external engine (PCE) responsible for the computation of tunnels in the network. Head-ends (or Path Computation Clients—PCCs) send requests to PCEs (PCReq messages) using the PCEP signaling protocol (RFC5440), and receive computed paths thanks to replies (PCRep messages). PCEs have been used mostly for back-up tunnel path computation and inter-domain (Inter-area/AS) path computations where per-domain path computation was the only (potentially very sub-optimal) technique available prior to the PCE.

In particular, the PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement") carried within a routing protocol message, which is sent from the PCE within its area or level or across the entire AS to advertise its services.

Generally, PCE functions are hosted on a BR between domains for inter-domain path computation, and there are typically at least two BRs, so there is no single point of failure. For example, ASBRs and ABRs tagged with an asterisk (*) in FIGS. 1A and 1B may be configured as PCEs. Note that while illustratively PCE functions are generally hosted on a BR, the techniques described herein are equally applicable to PCEs not hosted on a BR, accordingly.

Figure 3A:
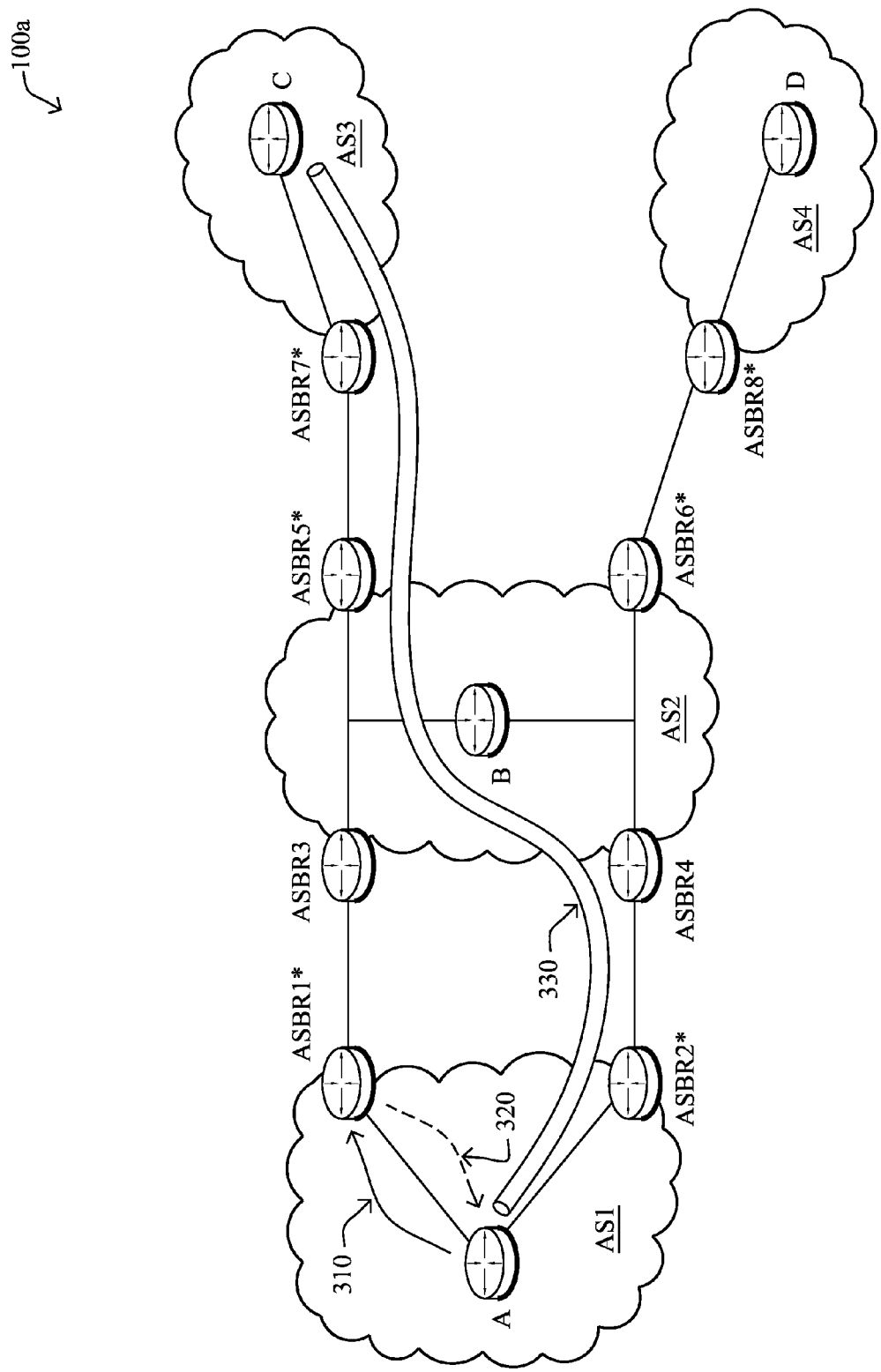
FIGS. 3A-3B illustrate examples of PCE-based tunnel computation in the networks of FIGS. 1A-1B.
Figure 3B:
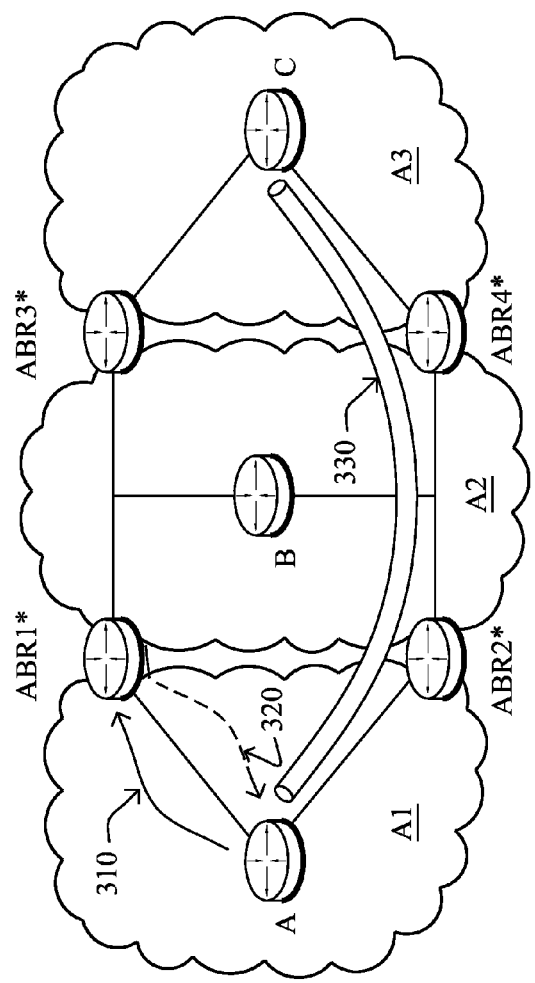

FIGS. 3A-3B illustrate simple examples of PCE-based tunnel computation in the networks 100a and 100b of FIGS. 1A-1B, respectively. In particular, assume in each instance that LSR A, acting as a PCC, requests, from a local PCE (e.g., ASBR1* or ABR1*, respectively), a tunnel to LSR C. The path computation request 310 results in computation of the path, and a path computation response 320 is returned to the head-end LSR A. The tunnel 330 may then be established, accordingly. (Note that for inter-domain computation, the local PCE may act as a PCC to other PCEs in other domains, as mentioned above.) Note further that while PCEs are particularly useful for inter-domain path computation, the techniques herein are not limited to inter-domain path computation, and may, in fact, be used for intra-domain path computation as well.

In PCE-based networks deployed so far, PCEs have been stateless: LSPs were computed by the PCE according to the Traffic Engineering Database (TED) fed in most cases by the routing protocol (ISIS or OSPF, more recently potentially using BGP) without requiring any state maintenance. Although the PCE architecture did refer to the potential use of stateful PCEs as a potentially more optimal model that would keep track of all LSPs states in the network when computing LSPs, the model was seen to be quite complex in terms of signaling, states maintenance, etc. with a number of very challenging issues.

It became apparent that stateful PCE was the solution of choice for several applications such as inter-layer optimizations or global optimization, but only recently did the number of use cases grow significantly considering increased requirements for advanced optimization of bandwidth resources. To that end, stateful PCEs have been implemented, and a stateful PCE draft standard was adopted as the IETF Working Document mentioned above entitled "PCEP Extensions for Stateful PCE", which specifies several new PCEP messages, allowing PCC to update the PCE on their LSP states (PCRpt messages), control LSP delegation (ability for the PCE to remotely control an LSP) and for the PCE to send LSP requests to PCC to learn states (PCUpd messages). As defined in the above document, a function can be initiated either from a PCC towards a PCE (C-E) or from a PCE towards a PCC (E-C). The new functions are:

Capability negotiation (E-C,C-E): Both the PCC and the PCE must announce during PCEP session establishment that they support PCEP Stateful PCE extensions defined in this document;

LSP state synchronization (C-E): After the session between the PCC and a stateful PCE is initialized, the PCE must learn the state of a PCC's LSPs before it can perform path computations or update LSP attributes in a PCC;

LSP Update Request (E-C): A PCE requests modification of attributes on a PCC's LSP;

LSP State Report (C-E): A PCC sends an LSP state report to a PCE whenever the state of an LSP changes; and LSP control delegation (C-E,E-C): A PCC grants to a PCE the right to update LSP attributes on one or more LSPs; the PCE becomes the authoritative source of the LSP's attributes as long as the delegation is in effect; the PCC may withdraw the delegation or the PCE may give up the delegation.

Stateful PCEs are slated to play a major role in future tunnel-enabled network architectures. Though the use of stateful PCEs is intended to solve a wide range of problems, they also bring a number of hard technical issues, including, but not limited to:

1) There are a number of situations where a PCE may receive a burst of signaling requests in the network, which is in contrast with the distributed nature of CSPF: when performing global reoptimizations, rerouting a large number of LSPs upon a link/node failure (in some networks, a single failure may lead to tens of thousands of LSP failures).

2) State maintenance is another critical issue. Stateful PCEs are required to maintain LSP states. When recomputing an LSP, this may first require displacing other LSPs in the network, leading to a very large number of signaling exchanges in the network.

3) Scaling of the overall architecture: attempts have been made to scale the stateful PCE architecture by distributing computation among several PCEs and allowing for inter-PCE communication when performing parallel computations of LSPs. These models have shown very limited scaling due to the number of signaling exchanges between PCEs (similar to IPCs between CPU in massive parallel computing issues).

4) PCE failure during operation of maintenance, which is not an issue when the PCE is stateless. Unfortunately, the issue is significantly more complex when the PCE fails during a maintenance operation (for example, when some LSPs have been updated and the PCE fails before reaching other head-ends and notifying them of an LSP path change that is required for the other LSPs to be routed in the network), thus leaving the network in a very unstable/unknown state.

Auto-bandwidth is an MPLS-based feature developed to allow for the dynamic resizing of TE LSPs based on forwarded traffic. Indeed, one of the major challenges with MPLS TE lies in the necessity to accurately determine the required bandwidth for each TE LSP. Strategies may consist of determining the TE LSP bandwidth and setting its bandwidth based on a percentage of the peak usage during a 24-hour period, using an average value, etc., based on observation (e.g., by a network management server or "NMS"). Unfortunately, in most cases the required bandwidth significantly varies during the course of the day and dynamic resizing is significantly useful (e.g., a must-have). Thus auto-bandwidth consists of observing the forwarded traffic and dynamically resizing the tunnel according to a multi-threshold mechanisms triggering a CSPF computation on the head-end.

Using auto-bandwidth in a stateful PCE architecture is, as currently defined, simply not applicable. Indeed, during the course of a day, the stateful PCE would receive a vast amount of requests for each TE LSP in the network (with can easily exceed hundreds of thousands of tunnels). The main concern is not limited to the number of requests that the PCE would receive but the constant re-optimization that this would trigger and the level of state maintenance and the fact that these bursts of requests are likely to take place simultaneously. With the current model, each head-end would keep sending requests to resize TE LSPs to the PCE, which would constantly re-compute an optimal placement of a large number of TE LSPs.

Time-Based Scheduling for Tunnels

The techniques herein dynamically resize tunnels in a stateful PCE environment, where new tunnel paths are anticipated based on traffic observations of past requests, and the planned new placement of tunnels, in light of the anticipated traffic (predictive bandwidth) with room for margin, may be communicated without explicit requests for path computation. For instance, the disclosure herein specifies a learning machine allowing stateful PCEs to learn tunnel traffic profiles first using auto-bandwidth, and then predictively augmenting their tunnel databases so as to take time scheduling into account and provide a <path, bandwidth, time> triplet to each requesting LSR on a per-tunnel basis for which a traffic profile has been deterministically learned. The triplet may be augmented with the margin for growth that can be used for minor bandwidth adjustments on the tunnel head-end.

Specifically, according to one or more embodiments of the disclosure as described in detail below, a PCE in a computer network receives one or more path computation requests (PCReqs), and records a time of each PCReq and the corresponding requested bandwidth. Based on this information, the PCE may determine a traffic profile of the computer network, and may augment a TED with requested bandwidth according to time based on the traffic profile. As such, prior to a particular time, the PCE may determine placement of tunnels within the traffic profile for the particular time.

Illustratively, the techniques described herein may be performed by hardware, software, and/or firmware, such as in accordance with the PCE/PCC process 248, which may contain computer executable instructions executed by the processor 220 to perform PCE/PCC functions relating to the techniques described herein (depending upon whether the acting device is a PCE or a PCC), e.g., in conjunction with routing process 244. For example, the techniques herein may be treated as extensions to conventional protocols, such as various PCE/PCC protocols (e.g., stateful PCE/PCC protocols), and as such, may be processed by similar components understood in the art that execute those protocols, accordingly. Notably, in this instance, a non-PCE/PCC device, e.g., an LSR, may also be configured to operate according to an illustrative PCE/PCC process 248, e.g., to perform the actions in conjunction with a PCE as described herein.

Operationally, the techniques herein make use of time-based scheduling mechanisms computed by the PCE based on the reception of request using a learning machine. In the initial state, each LSR in the network may simply use the existing auto-bandwidth mechanism: that is, when resizing is determined as required by a head-end, the LSR would simply send a new path computation to the stateful PCE (a PCReq message), which would in turn compute the new path for the resized LSP and return the path using a PCRep message.

Figure 4:
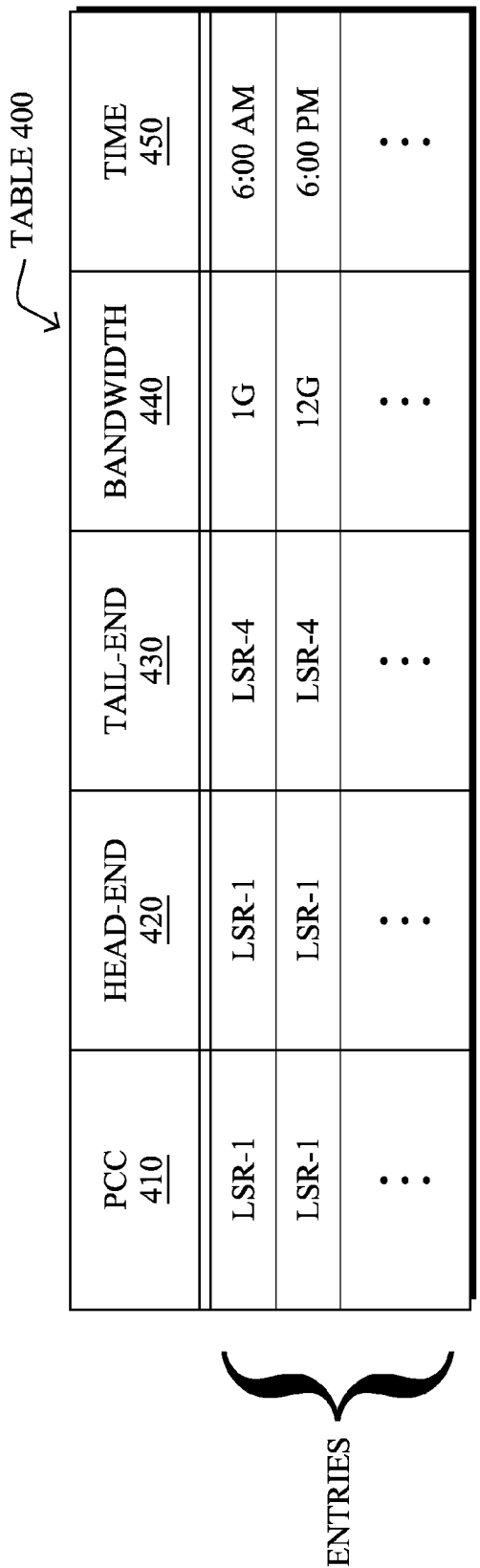
FIG. 4 illustrates an example path computation request table structure.

A first component of the techniques herein comprises recording the time and requested bandwidth for the tunnels as requested. In particular, upon receiving PCReqs, a PCE records a time of each PCReq and the corresponding requested bandwidth. For instance, as shown in FIG. 4, a table 400 (e.g., a database of tunnels in the network) is maintained by the stateful PCE, and augmented by adding a history of the bandwidth requests over time, for each tunnel. For example, the table 400 may store tunnels in terms of a PCC 410, a head-end node 420, a tail-end node 430, a requested bandwidth 440, and a time of the request 450. Those skilled in the art will appreciate that table 400 is merely an example, and is not meant to limit the embodiments herein. Note that the bandwidth requests may be recorded by the PCE whether or not the signaling is successful in the network (e.g., confirmed by the reception of a PCUpt message). This allows the PCE to record a traffic profile history for each tunnel in the network.

At this point, the PCE may make use of a learning engine in order to determine a traffic profile of the computer network, with a specified level of predictability, based on the recorded time and requested bandwidth of the PCReqs. Generally speaking, in many service provider environments, most tunnels have a very specific and predictable traffic profile. Note that the PCE may decide to only determine a tunnel traffic profile for a 24 h period (substantially daily), or an entire week in order to capture traffic patterns over the week (e.g., lower traffic over weekends). Additionally, certain provisions may be made to plan for manually scheduled events at certain times in the future, such as video conferences or recurring telecasts, etc.

Figure 5:
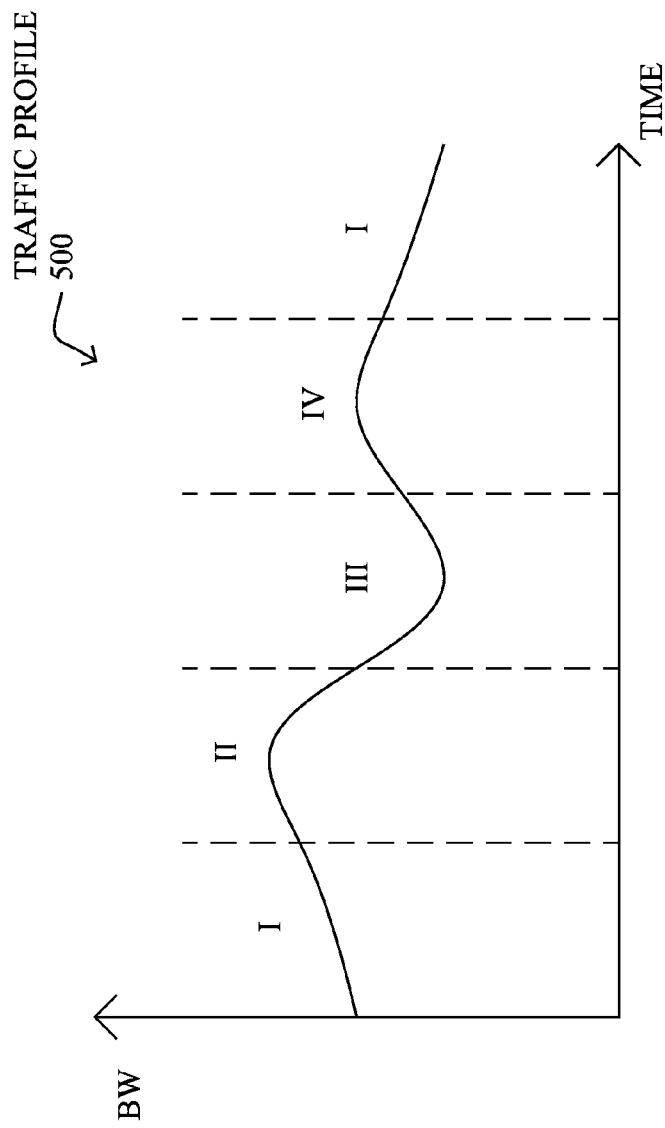
FIG. 5 illustrates an example traffic profile.

FIG. 5 illustrates an example traffic profile 500 of a given reference point (e.g., a node, a link, a tunnel, a region of a network, etc.). As shown, various times of day result in different bandwidth requirements, such as referenced by regions "I" through "IV". Once the traffic profile has been determined with a sufficient level of confidence (which may not always be possible), the PCE augments its tunnel database (TED) with bandwidth requirements according to the time.

Figure 6A:
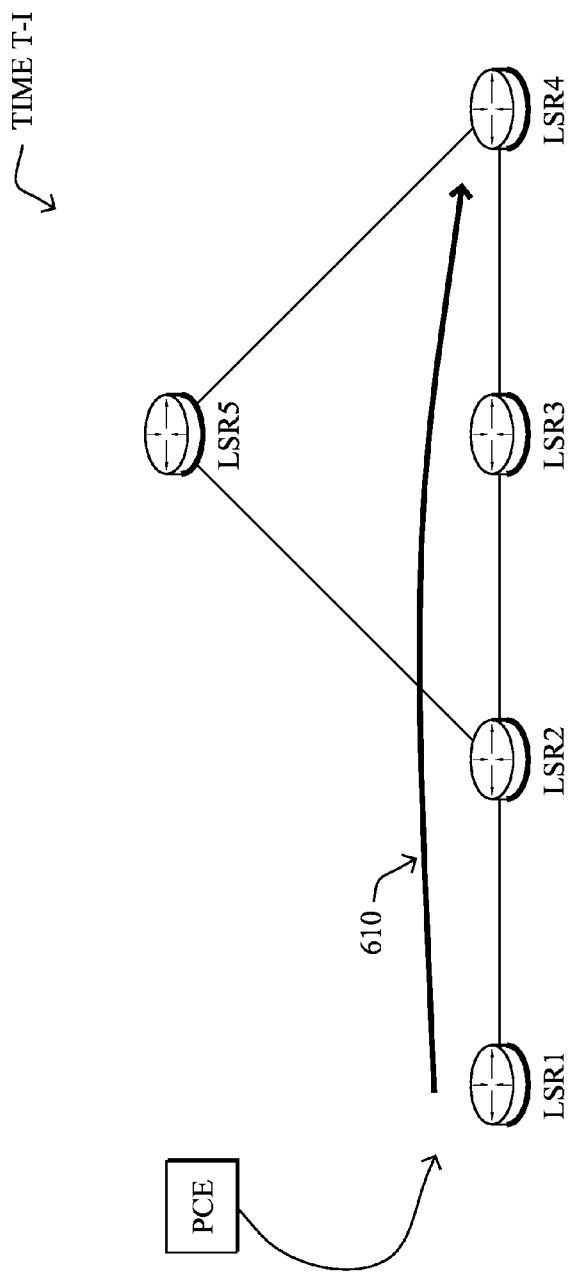
FIGS. 6A-6B illustrate examples of tunnels based on the traffic profile.
Figure 6B:
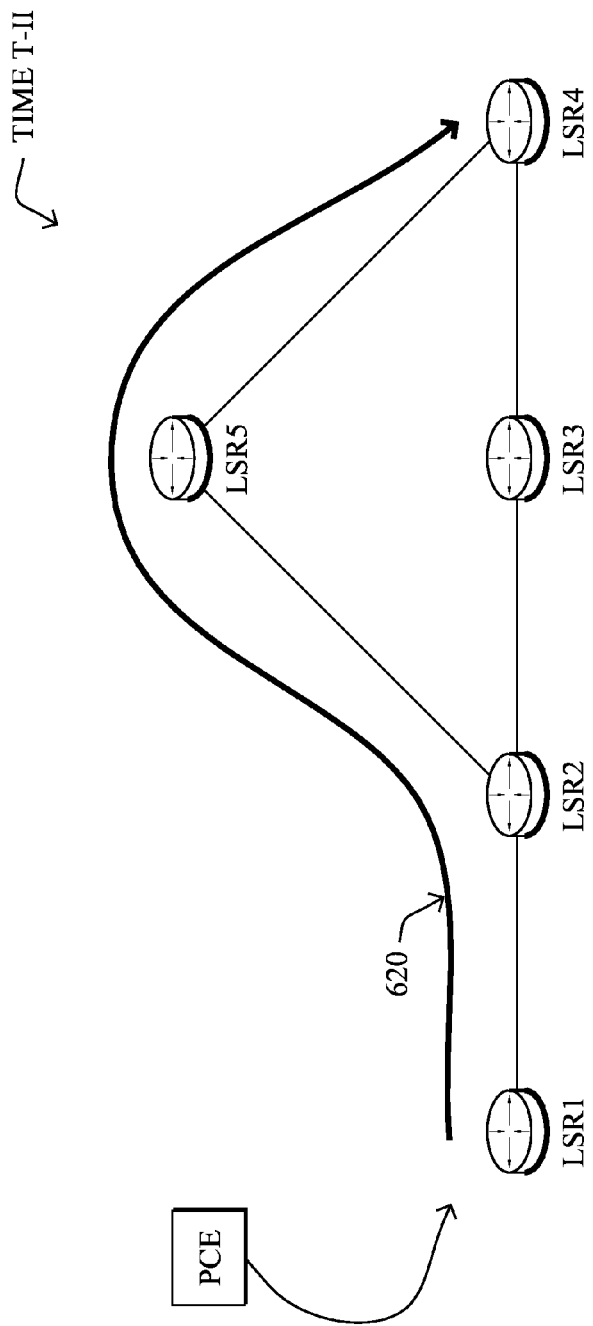

A second component of the techniques herein comprises performing background computations so as to determine an optimal placement of the set of tunnels for which the traffic profile has been recorded. Said differently, the PCE may determine, prior to a particular time, placement of tunnels within the traffic profile for that particular time. The output of such computation is thus a placement of the tunnels according to time. For instance, as shown in the simplified example in FIGS. 6A-6B, assume that tunnel 610 is optimal during timeslot "I" in FIG. 6A, and that during timeslot "II" in FIG. 6B, tunnel 620 is more optimal. Note that while in this example the tunnels change paths between the timeslots, in other situations simply the levels of bandwidth reservation may change on certain tunnels.

In accordance with one or more embodiments herein, a signaling extension of the PCEP protocol is defined where a new PCEP object is specified and carried within the PCRep message that provides the set of paths according size and bandwidth and time, as opposed to a single path. This object may thus be used to signal the placement of the tunnels for the particular time, including an estimated bandwidth, thus causing the head-end nodes to establish the tunnels without sending a new PCReq at the particular time. In particular, upon receiving the reply (PCRep), each LSR records the time, bandwidth, and path, and starts to schedule the tunnel resizing.

Note that each LSR may continue to observe the actual bandwidth usage in order to determine any potential deviation between the tunnel bandwidth computed by the stateful PCE based on former requests and the current bandwidth requirement, should the scheduling be adapted over time. If the deviation exceeds some pre-defined threshold, the LSR may send a new PCReq to the stateful PCE after setting a newly defined flag indicating that a schedule has been received in the past by the stateful PCE. That is, head-end nodes within the network monitor their own bandwidth requirements, and may send an updated PCReq in response to a change in the bandwidth requirements. This allows the stateful PCE to continuously improve its knowledge of the bandwidth requirement for the tunnel and potentially re-optimize the overall tunnel placement.

In yet another embodiment, the described PCEP protocol extension may be augmented with a "local-right-to-grow margin" object, such that the PCE may signal, to a head-end node, a right to grow a tunnel over time up to a maximum value. In particular, when a PCE computes a path for a client, the PCE may add a new object which defines the right for the head-end node (or PCC) to unilaterally use the client-head-end reoptimization functionality to grow (increase) the tunnel bandwidth (or decrease it). Generally, the right to grow is associated with one constraint: the path must not be changed. For example, PCE says to router LSR1 that it should book 1G through LSR1/LSR2/LSR3/LSR4 and that it can unilaterally use head-end based reoptimization to grow the tunnel (along that path) up to 12G. If it succeeds, the client updates the state of the PCE accordingly, and optionally, the PCE server can immediately upon receiving the update or periodically, compute a new local-right-to-grow margin and communicate it to the client. That is, the PCE may receive an indication from the head-end node that the tunnel has been grown locally, and in response, recomputes the head-end node's right to grow the tunnel. Note that the PCE may want to be informed that the head-end has grown the tunnel, still to update its TED but without changing anything, since updating the TED would help to serve future requests.

Figure 7:
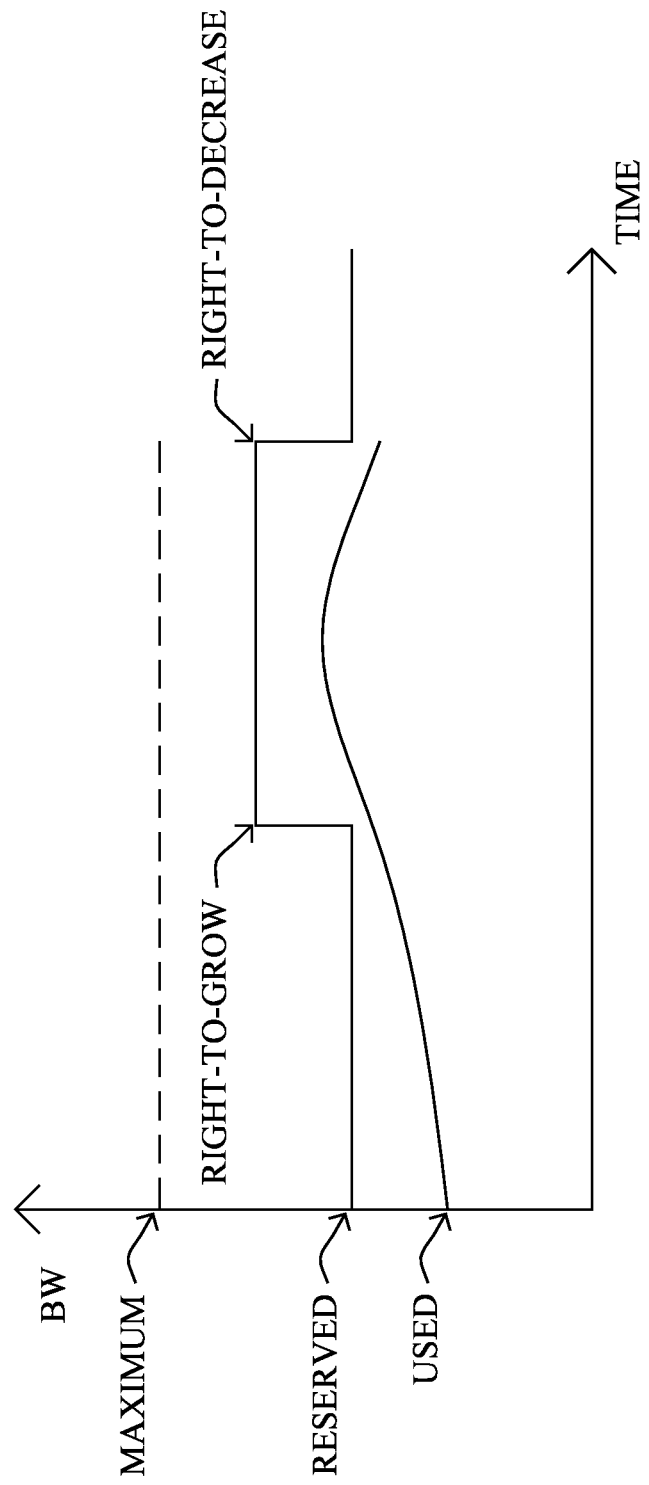
FIG. 7 illustrates an example of self-adjusted bandwidth signaling.

FIG. 7 illustrates a simplified example of right-to-grow functionality, where a tunnel reserves a particular bandwidth, and based on usage, may grow (or reduce) the reserved bandwidth up to a maximum level. Note that if it fails, then the client may use local policy to determine how important the bandwidth increase is and if important enough may then decide to use one of the alternate paths provided by the time-slot described behavior (or may skip this timeslot behavior entirely and simply request the PCE perform a new synchronous/higher priority computation.)

Note that in one or more additional embodiments, the techniques herein may monitor overall utilization of the links over time, and may determine periods of time where reducing the size of a tunnel achieves basically little gain within the network (that is, the excess capacity is not needed by other tunnels/applications). For those periods, the bandwidth reservation may be left at a higher level to reduce signaling (and demand calculation) both on the increase and decrease side of resizing a tunnel. In other words, the PCE may determine where reducing bandwidth of a tunnel based on the traffic profile is not needed, and may thus maintain the tunnel at a peak bandwidth value of the traffic profile (i.e., the peak reserved bandwidth) regardless of time.

Figure 8:
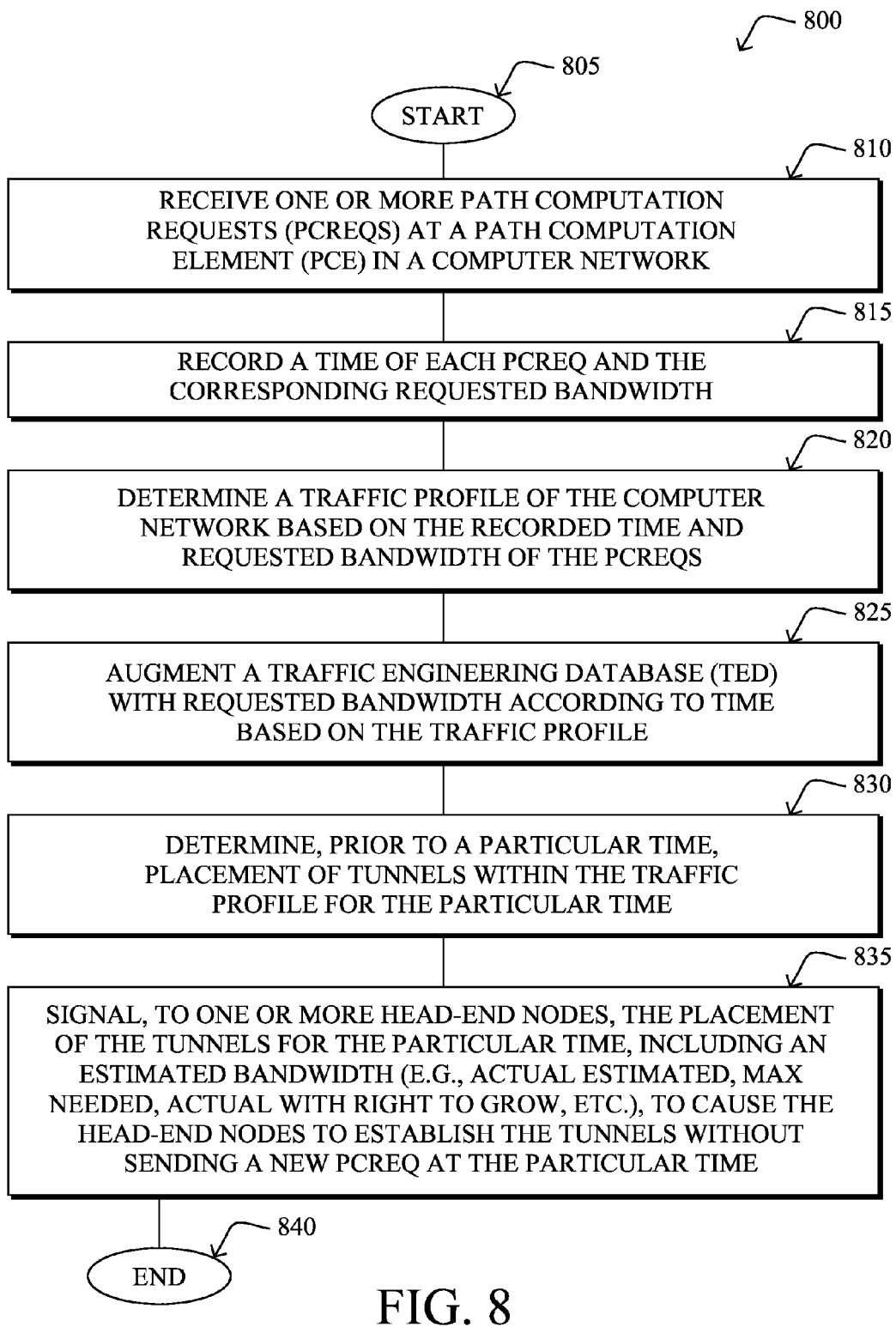
FIG. 8 illustrates an example simplified procedure for time-based scheduling for tunnels computed by a stateful PCE.

FIG. 8 illustrates an example simplified procedure 800 for time-based scheduling for tunnels computed by a stateful PCE in accordance with one or more embodiments described herein. The procedure 800 may start at step 805, and continues to step 810, where, as described in greater detail above, a PCE receives one or more PCReqs, and records a time of each PCReq and the corresponding requested bandwidth in step 815, accordingly. Based on the recorded time and requested bandwidth of the PCReqs, in step 820 the PCE may correspondingly determine a traffic profile of the computer network, and augments its TED with requested bandwidth according to time based on the traffic profile in step 825. As such, in step 830, the PCE may determine, prior to a particular time, placement of tunnels within the traffic profile for the particular time. Either at the particular time, or else in advance with appropriate instruction, in step 835 the PCE may signal, to one or more head-end nodes, the placement of the tunnels for the particular time, including an estimated bandwidth (e.g., actual estimated, max needed, actual with right to grow, etc., as described above), to cause the head-end nodes to establish the tunnels without sending a new PCReq at the particular time. The illustrative (and simplified) procedure 800 may then end in step 840, notably with the option to return to any step above to receive additional PCReqs, determine updated traffic profiles, etc.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for time-based scheduling for tunnels computed by a stateful PCE. In particular, the techniques herein direct stateful PCEs to perform pre-computation of tunnels according to traffic profiles, where the use of scheduling allows for a significant reduction in the number of signaling requests and tunnel path modifications in the system, thus improving the overall stability of a stateful PCE environment. In addition, the techniques herein greatly increase the viability of an auto-bandwidth approach when used in combination with stateful PCEs.

While there have been shown and described illustrative embodiments that provide enhanced operation for stateful PCE architectures, it is to be understood that various other adaptations and modifications may be made within the spirit and scope of the embodiments herein. For example, the embodiments have been shown and described herein with relation to MPLS TE-LSPs and other various protocols. However, the embodiments in their broader sense are not as limited, and may, in fact, be used with any function for which a PCE may be responsible, such as other types of tunnels, other types of path computation, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving one or more path computation requests (PCReqs) at a path computation element (PCE) in a computer network;
   recording, by the PCE, a time of that each PCReq is received and an amount of bandwidth that is request by each PCReq at the time by each PCReq;

determining, by the PCE, a traffic profile of the computer network based history of the bandwidth requested over time;

predictively augmenting, by the PCE, a traffic engineering database (TED) with requested bandwidth according to time based on the traffic profile;

determining, by the PCE prior to a particular time, placement of tunnels within the traffic profile for the particular time; and signaling, by the PCE to one or more head-ends nodes, the placement of the tunnels for the particular time.

2. The method as in claim 1, further comprising:

signaling, to one or more head-end nodes, the placement of the tunnels for the particular time, including an estimated bandwidth, to cause the head-end nodes to establish the tunnels without sending a new PCReq at the particular time.

3. The method as in claim 1, wherein the traffic profile is based on a daily period.

4. The method as in claim 1, wherein the traffic profile is based on a weekly period.

5. The method as in claim 1, wherein head-end nodes within the network monitor their own bandwidth requirements, and send an updated PCReq in response to a change in the bandwidth requirements.

6. The method as in claim 1, further comprising:

signaling, to a head-end node, a right to grow a tunnel over time up to a maximum value.

7. The method as in claim 6, further comprising:

receiving an indication from the head-end node that the tunnel has been grown locally; and in response to receiving the indication, recomputing the head-end node's right to grow the tunnel.

8. The method as in claim 1, wherein the traffic profile is based on manually scheduled events.

9. The method as in claim 1, further comprising:

determining where reducing bandwidth of a tunnel based on the traffic profile is not needed; and maintaining the tunnel at a peak bandwidth value of the traffic profile regardless of time.

10. An apparatus, comprising:

one or more network interfaces to communicate within a computer network as a path computation element (PCE);

a processor coupled to the network interfaces and adapted to execute one or more processes; and a memory configured to store a process executable by the processor, the process when executed operable to:

receive one or more path computation requests (PCReqs);

record a time that each PCReq is received and an amount of bandwidth that is request by each PCReq at the time;

determine a traffic profile of the computer network based a history of the bandwidth requested over time by each PCReq;

predictively augment a traffic engineering database (TED) with requested bandwidth according to time based on the traffic profile;

determine, prior to a particular time, placement of tunnels within the traffic profile for the particular time; and signal, to one or more head-ends nodes, the placement of the tunnels for the particular time.

11. The apparatus as in claim 10, wherein the process when executed is further operable to:

signal, to one or more head-end nodes, the placement of the tunnels for the particular time, including an estimated bandwidth, to cause the head-end nodes to establish the tunnels without sending a new PCReq at the particular time.

12. The apparatus as in claim 10, wherein the traffic profile is based on a daily period.

13. The apparatus as in claim 10, wherein the traffic profile is based on a weekly period.

14. The apparatus as in claim 10, wherein head-end nodes within the network monitor their own bandwidth requirements, and send an updated PCReq in response to a change in the bandwidth requirements.

15. The apparatus as in claim 10, wherein the process when executed is further operable to:

signal, to a head-end node, a right to grow a tunnel over time up to a maximum value.

16. The apparatus as in claim 15, wherein the process when executed is further operable to:

receive an indication from the head-end node that the tunnel has been grown locally; and in response to receiving the indication, recompute the head-end node's right to grow the tunnel.

17. The apparatus as in claim 10, wherein the traffic profile is based on manually scheduled events.

18. The apparatus as in claim 10, wherein the process when executed is further operable to:

determine where reducing bandwidth of a tunnel based on the traffic profile is not needed; and maintain the tunnel at a peak bandwidth value of the traffic profile regardless of time.

19. A tangible, non-transitory, computer-readable media having software encoded thereon, the software when executed by a processor operable to:

receive one or more path computation requests (PCReqs);

record a time that each PCReq is received and an amount of bandwidth that is request by each PCReq at the time;

determine a traffic profile of the computer network based on a history of the bandwidth requested over time by each PCReq;

predictively augment a traffic engineering database (TED) with requested bandwidth according to time based on the traffic profile;

determine, prior to a particular time, placement of tunnels within the traffic profile for the particular time; and signal, to one or more head-ends nodes, the placement of the tunnels for the particular time.

20. The computer-readable media as in claim 19, wherein the software when executed is further operable to:

signal, to one or more head-end nodes, the placement of the tunnels for the particular time, including an estimated bandwidth, to cause the head-end nodes to establish the tunnels without sending a new PCReq at the particular time.

* * * * *